United States Patent [19]

Wagner

[11] 4,182,604

[45] Jan. 8, 1980

[54] BLOCKING MACHINE

[75] Inventor: Wesley R. Wagner, Kent, Wash.

[73] Assignee: Keith Manufacturing, Madras, Oreg.

[21] Appl. No.: 877,518

[22] Filed: Feb. 13, 1978

[51] Int. Cl.$^2$ .............................................. B29C 15/00

[52] U.S. Cl. .......................... 425/237; 425/DIG. 230

[58] Field of Search ...................... 425/DIG. 230, 237

[56] References Cited

U.S. PATENT DOCUMENTS

| | | | |
|---|---|---|---|
| 712,735 | 11/1902 | Simons et al. | 425/237 X |
| 741,511 | 10/1903 | Layng | 425/237 |
| 809,554 | 1/1906 | Cole | 425/237 X |
| 3,249,069 | 5/1966 | Forth | 425/DIG. 230 |
| 3,385,235 | 5/1968 | Richerd et al. | 425/DIG. 230 |

*Primary Examiner*—Robert L. Spicer, Jr.
*Attorney, Agent, or Firm*—Delbert J. Barnard

[57] ABSTRACT

Loose hay or the like is delivered into a progressively narrowing axial space between two rows of identical teeth which project towards each other from side locations on a pair of obliquely related wheels. The hay or other material is simultaneously compressed and advanced by the teeth as they come together. The teeth form axial boundaries for pockets or chambers in which the hay or other material is compressed into blocks. The radial boundaries of such pockets or chambers are formed by an annular outer wall carried by one of the wheels and an annular inner wall carried by the other wheel. One of the wheels is mounted for rotation in a fixed position. The other wheel is mounted for rotation by mounting means which can be shifted in position for the purpose of varying the axial space between the two wheels, for adjustment of the pocket size.

6 Claims, 7 Drawing Figures

BLOCKING MACHINE

BACKGROUND OF THE INVENTION

1. Field of the Invention

This invention relates to mechanism for forming loose hay or the like in compact blocks.

2. Description of the Prior Art

Machines exist for taking loose hay and forming it into compact blocks for use as animal feed. The blocks provide a convenient way of accurately measuring feed and feed presented in this manner is usually not wasted by the animal. Hay that is loose or that has been formed into bales tends to stick together. When an animal such as a horse or a cow grabs a hold of loose or baled hay it usually picks up more than a mouthful. The excess hay quite often drops to the ground and is walked into the ground rather than being eaten.

Known mechanism for forming hay into blocks are characterized by a pair of wheels which rotate about parallel axes and form a nip at their peripheries into which the hay is fed. A problem with machines of this type is that they involve a relatively wide angle between the two wheels except at the nip itself, resulting in it being difficult for the wheels to grab the hay except at the nip. In known machines of this kind the hay is fed through a relatively small size inlet designed to deliver the hay substantially at the nip. The small size inlet limits the capacity of the machine (e.g. in a known machine to about ten tons per hour). Also, the hay has to be chopped up into short lengths. Such chopping is undesirable if the hay is to be used for cattle feed because cattle require long hay for proper digestion. It is known that when cattle are fed chopped hay over a period of time they suffer stomach and digestive tract problems.

SUMMARY OF THE INVENTION

The mechanism of the present invention for forming loose hay or the like into compact blocks is basically characterized by a pair of presser wheels which carry complementary rings of axially projecting presser teeth adjacent their peripheries. The teeth come together at a side location and from such location the two wheels diverge apart to form an acute angle between them. This relationship provides a relatively long sharp angled path for hay or the like into the forming region and results in a constant positive feed. Long hay can be compacted and a high feed rate (e.g. twenty tons per hour) can be achieved.

According to the invention, one of the wheels carries an annular ring which provides a wall or closure radially outwardly of both rows of teeth where they meet to form the pocket. The other wheel carries a ring which forms an annular wall or closure radially inwardly of the pocket region.

According to an aspect of the invention, one of the wheels is positively driven and it in turn drives the other wheel.

In accordance with another aspect of the invention, one of the wheels is mounted for rotation by a bearing structure which is fixed in position. The other wheel is mounted for rotation by a bearing structure which is mounted to be adjusted in position relative to the first wheel, for changing the distance between the two wheels where they come together to form the pocket, to in this manner adjust the size of the pocket and the size of the blocks being formed.

According to an aspect of the invention, a density control mechanism is associated with the two wheels and functions to automatically adjust the spacing of the two wheels in response to pressure of the hay or the like, so that the material which is fed into the pockets will move the two wheels relatively apart until a predetermined desired density of the blocks is achieved.

The invention further relates to various details in construction and arrangement of the components of the illustrated embodiment.

BRIEF DESCRIPTION OF THE DRAWING

FIG. 6 is an isometric view of a block of hay or the like; and

DESCRIPTION OF THE PREFERRED EMBODIMENT

The illustrated embodiment is especially adapted for forming hay into compact blocks. It may be incorporated within a self-propelled vehicle and adapted to operate as the vehicle is moving ahead and picking up hay, or it may be fixed in position and supplied with hay by means of some sort of conveyor or feeding mechanism.

A typical vehicular installation might comprise a pickup and feed mechanism which would be located forwardly of the block forming mechanism. It would function to pick up hay or the like and feed it into the block forming mechanism. The vehicular machine would also include some sort of mechanism for collecting the blocks as they leave the block forming mechanism. The present invention relates only to the block forming mechanism. Hence, only an embodiment of the block forming mechanism is shown and described.

Figure 1:
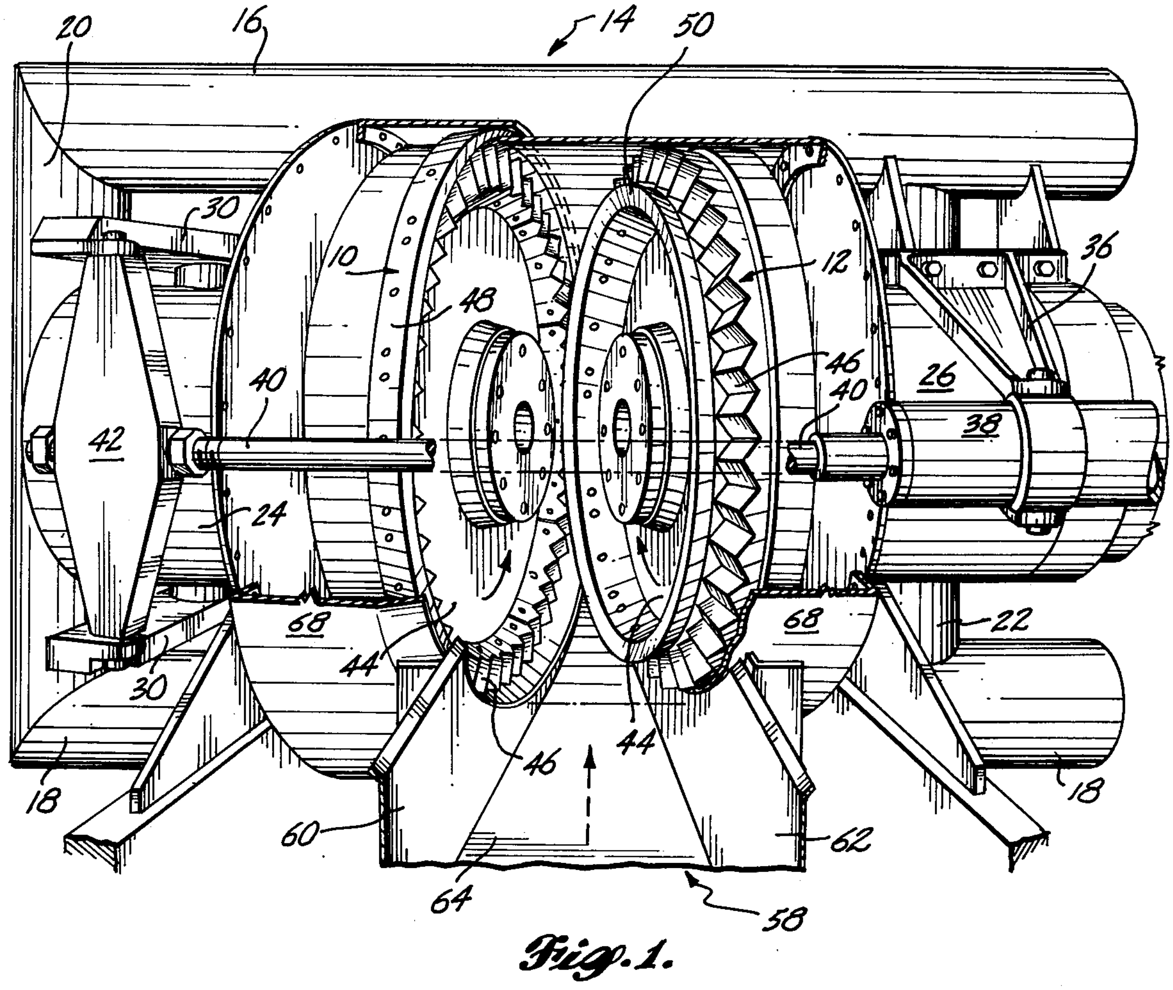
FIG. 1 is a pictorial view looking towards the front of the block forming mechanism, substantially along the infeed line, with some parts cut away or omitted for clarity of illustration of other parts.
Figure 3:
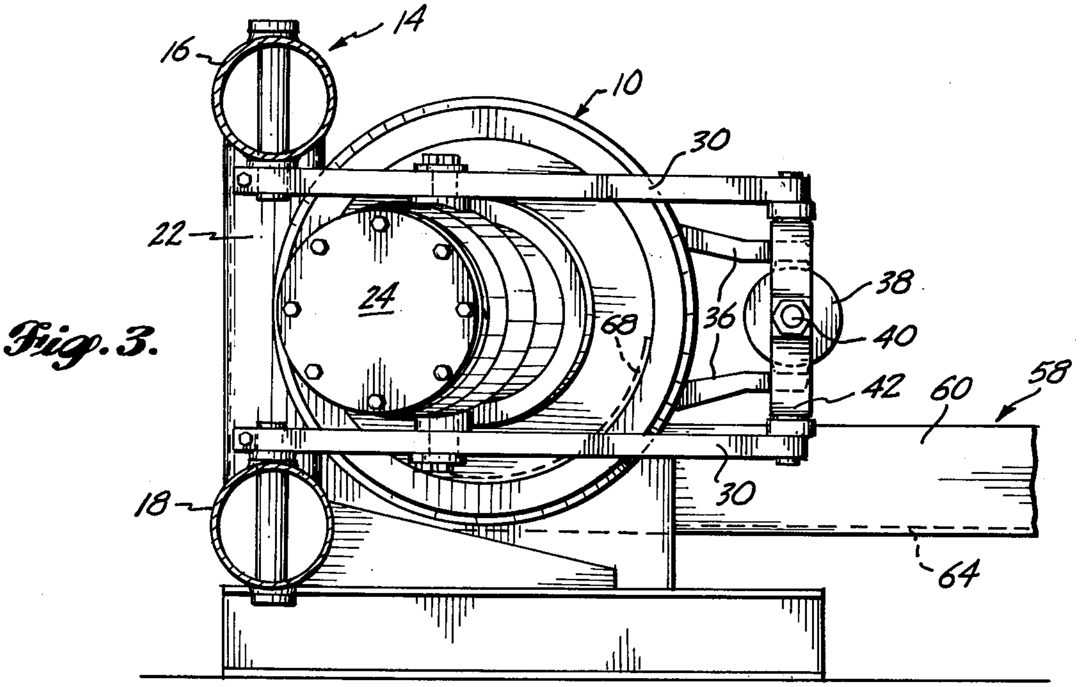
FIG. 3 is a sectional view, taken substantially along line 3—3 of FIG. 2.
Figure 2:
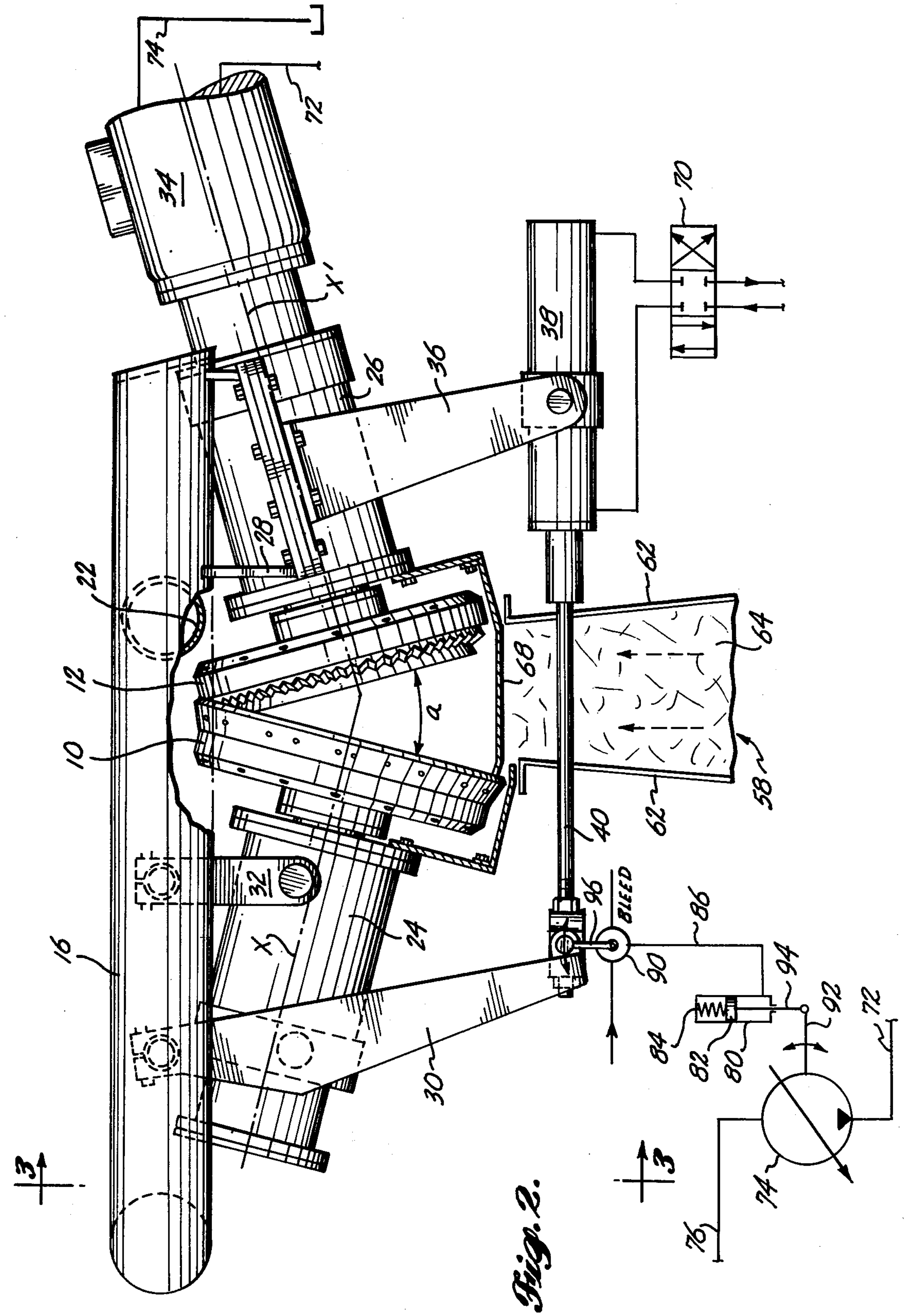
FIG. 2 is a top plan view of the mechanism shown by FIG. 1, with some parts cut away or omitted for clarity of illustration of other parts, and including a schematic diagram of a typical control circuit.

Referring to FIGS. 1-3, the preferred embodiment is intended for use in a vehicular machine and is oriented to receive hay which is picked up by the machine and moved relatively rearwardly along a line coinciding with the path of travel of the machine.

The basic components of the block forming mechanism are a pair of presser wheels 10, 12 which are mounted for rotation about first and second axes, X, X'. The presser wheels 10, 12 are obliquely related and define between them an acute angle which by way of example may be about 25°-35°. Also by way of example, each wheel 10, 12 may measure about 25-30 inches in diameter.

As shown by FIGS. 1-3, the wheels 10, 12 may be mounted onto a frame 14 comprising tubular upper and lower horizontal members 16, 18 and tubular vertical side members 20, 22.

Each presser wheel 10, 12 is mounted at the end of an elongated shaft which in turn is mounted for rotation by axially spaced apart bearings within bearing housings 24, 26. Bracket means 28 interconnected between bearing housing 26 and frame 14 serves to mount presser wheel 12 for rotation in a fixed position. Parallelogram linkage, comprising spaced apart pairs of arms 30, 32, form an adjustable mount for wheel 10. An upper link 32 and a lower link 32 are each pivotally connected at one end to the frame member 16, 18 and at the opposite end are pivotally connected to the bearing housing 24. Arms 30 are similarly pivotally connected to both the frame members 16, 18 and the bearing housing 24. The four pivotal axes are located to define a parallelogram, so that upon movement of the linkage, by application of a force to the forward ends of arms 30, the bearing housing 24, and hence the wheel 10, will move laterally relative to the fixed wheel 12, but without an appreciable change in the angle between the two wheels 10, 12. As will hereinafter be explained in greater detail, the movable mounting of wheel 10 provides a way of adjusting the lateral spacing of the two wheels 10, 12 where they come generally together at the rear of the mechanism.

Wheel 12 may be positively driven by a motor 34 and wheel 12 may in turn drive wheel 10. A pair of support arms may be bracketed onto the bearing housing 26, to extend forwardly and support between them a linear hydraulic motor 38. The cylinder or piston housing of motor 38 is connected to arms 36 for pivotal movement about a vertical axis. The free end of a piston rod 40 is connected to a vertical member 42 which is connected at its upper and lower ends to the forward ends of the arms 30, for pivotal movement about a vertical axis. Extension and retraction of the linear hydraulic motor 38 applies a force on the forward ends of arms 30 which makes the parallelogram mechanism 30, 32 function to shift presser wheel 10 in position relative to presser wheel 12.

Each wheel 10, 12 may have a disc body 44 onto which are secured presser teeth 46 and annular wall forming rings 48, 50.

Figure 4:
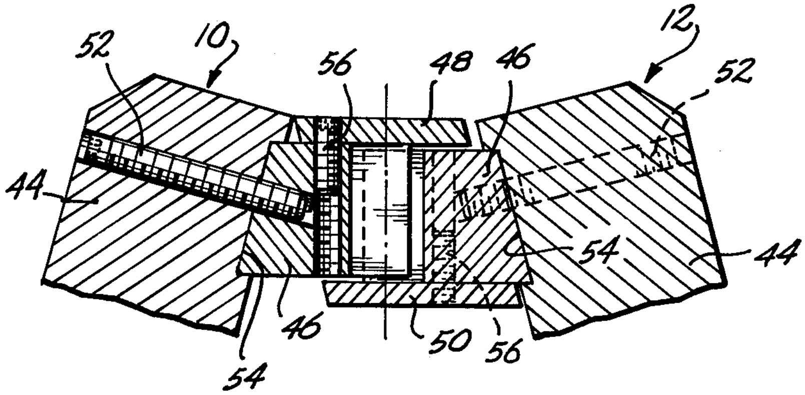
FIG. 4 is a fragmentary section view taken through the two presser wheels where they meet to form compaction pockets.
Figure 6:
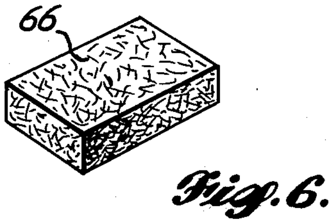

The presser teeth 46 may be formed in segments which are secured to the disc bodies 44, such as by means of countersunk bolts 52, for example (FIG. 4). FIG. 1 shows the segmented construction of the rows of teeth on wheels 10, 12. FIG. 4 shows the cross-sectional configuration of the tooth segments.

As also shown by FIG. 4, an annular channel 54 may be formed in each disc body 44 to receive base portions of the tooth segments. As also shown by FIG. 4, the two annular wall forming rings 48, 50 may be bolted to the tooth segments, such as by use of countersunk bolts 56 which extend through openings formed in the rings 48, 50 and thread into threaded openings formed in the tooth segments.

As also best shown by FIG. 4, the two rings of teeth 46 are identical and when they come together at the rear of the mechanism they substantially mesh similar to the way gear teeth mesh. Ring 48 is located radially outwardly of the teeth 46 on disc 10. Also, whereas, the teeth 46 and the ring 48 both project generally axially from disc body 44, the ring 48 projects axially a greater distance than the teeth 46. Similarly, teeth 46 and ring 50 on wheel 12 both project axially from the disc body 44 and ring 50 project axially a greater distance than the teeth 46. As a result, when the teeth come together at the rear of the mechanism to define chambers or pockets between them, in the region of such chambers or pockets the outer ring 48 occupies a position radially outwardly of both sets of teeth 46 and the ring 50 occupies a position radially inwardly of both sets of teeth 46. Thus, the pockets are defined on their sides by the surfaces of the mating teeth 46 and are closed at their ends by the rings 48, 50.

As shown by FIGS. 1-3, a trough-like structure 58, having opposed side walls 60, 62 and a bottom 64, leads generally tangentially into the lower portion of the space between the two rows of teeth 46. Preferably, the hay or other substance being treated is delivered into the mechanism at a rate of travel equal to or slightly greater than the speed of travel of the teeth 46, to ensure a good flow of hay into and through the block forming region.

Figure 5:
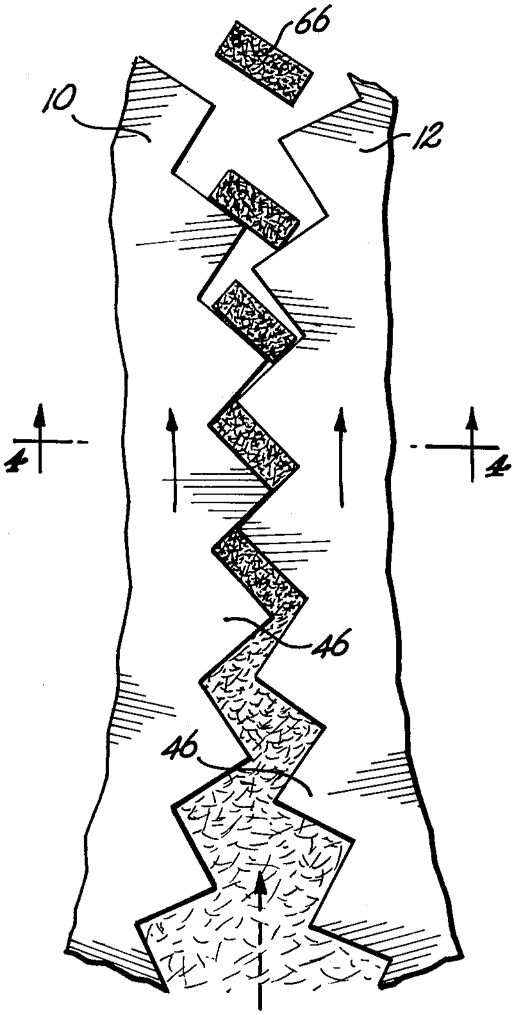
FIG. 5 is a flattened out view of the presser teeth first coming together and then separating, showing the sequence of operation.
Figure 7:
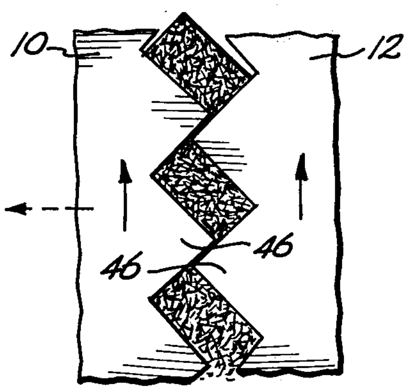
FIG. 7 is a view like FIG. 5, but of a smaller area, showing the two presser wheels adjusted to define thicker pockets and hence thicker blocks.

Referring now to FIG. 5, incoming hay or the like is trapped axially between the two sets of teeth 46. As the teeth come together they both compress and compact the hay and move it on through the mechanism. The trapped hay exerts a resistance force on both wheels 10, 12, so that the pressure of the hay will move the movable wheel 10 outwardly in opposition to the force applied by cylinder 38 until a predetermined size of the hay blocks is achieved. FIG. 7 shows the results of a thicker block setting of cylinder 38 than FIG. 5.

As the teeth 46 move apart downstream of the location of maximum compaction and minimum pocket size, the pockets open up and surface portions of the teeth 46 roll the blocks over and start them along a path of travel away from the block forming mechanism.

As shown by FIG. 1, the bottom wall 64 of the feed channel curves upwardly to help guide the hay or the like into the space axially between the two sets of teeth 46. Similarly, a curved shield 68 (FIGS. 2 and 3) is located between the two wheels 10, 12, for directing the loose hay downwardly to the two rows of teeth 46. The bottom 64 of channel 58 forms a boundary for the hay radially outwardly of the teeth 46. The curved shield 68 forms a similar boundary radially inwardly of the teeth 46.

Referring to the schematic diagram portion of FIG. 2, linear motor 38 may be a double acting hydraulic motor provided with a conventional control valve 70. Drive motor 34 may be a hydraulic motor having a feed line 72 and a return line 74. A variable displacement pump 74 may be provided for supplying hydraulic fluid, to pump 74 via a conduit 76, into the motor feed line 72. According to an aspect of the invention, a pneumatic sensor or the like is mounted to be actuated by movement of either rod 40 or arm 30. The actuator may comprise an air cylinder 78 having an air chamber 80 on one side of its piston 82 and a spring 84 on the opposite side. Air may be delivered into chamber 80 via a delivery line 86 which includes a modulating pressure type control valve 90. A mechanical connection, such as a lever 92 may extend between the piston rod 94 and the displacement control portion of pump 74. A similar lever 96 may be interconnected between rod 40 and valve 90 so that movement of rod 40 will result in movement of lever 96 and a change in position of valve 90.

Valve 70 is operated to move cylinder 38 so that cylinder 38 will in turn move the movable presser wheel 10 in position relative to the fixed presser wheel 12 for the purpose of establishing a desired density of the blocks 66. Control valve 90 is operated to establish a desired displacement of pump 74. Then, during operation, if for some reason the flow rate of hay into the compacting pockets decreases slightly, resulting in some movement of movable presser wheel 10 and its mounting towards fixed presser wheel 12 and its mounting, such movement will be sensed by the modulating valve 90. Valve 90 will react to change pressure within chamber 80, causing movement of lever 92 to decrease the displacement of pump 74. Flow of hydraulic fluid to motor 34 is reduced and in turn the rotation speed of the presser wheels 10, 12 is reduced. This results in an increase of the cube thickness to bring it back up to the desired size. As will be evident, the control mechanism will also function to automatically increase the rotational speed of wheels 10, 12, to reduce cube thickness.

The illustrated embodiment has been especially adapted for use to compact loose hay into feed blocks. However, it is to be understood that the mechanism might also be used for compacting other types of vegetation into feed blocks, or to compact various types of matter (e.g. straw, grasses, etc.) into blocks for use as fuel, or any other purpose. Accordingly, the expression "hay or the like" is used herein to mean any relatively loose form material that can be compacted together under pressure to form blocks.

What is claimed is:

1. A mechanism for forming loose hay or the like into compact blocks, comprising:

a first presser wheel including a first ring of axially projecting presser teeth and an annular first wall located radially outwardly of the presser teeth and projecting axially beyond them;

a second presser wheel including a second ring of axially projecting presser teeth and an annular second wall located radially inwardly of the presser teeth and projecting axially beyond them;

first mounting means mounting said first presser wheel for rotation about a first axis;

second mounting means mounting said second presser wheel for rotation about a second axis which intersects the first axis to provide a compressing set of presser teeth;

means to drive both the first and second presser wheels;

wherein the first and second presser wheels are obliquely related and come relatively together at a side location wherein the first and second wall ring and presser teeth form pockets, and wherein at such side location the first wall is located radially outwardly of each set of presser teeth and forms an outer radial boundary for the pockets, the second wall is located radially inwardly of both sets of presser teeth and forms an inner radial boundary for the pockets, and the presser teeth on the two presser wheels come together in a meshing compressing relationship in pairs to define the remaining boundaries of the pockets; and means for feeding loose hay or the like into the space between the two rings of teeth ahead of where the teeth meet in pairs to form the pockets.

2. Mechanism according to claim 1, including means for adjusting the lateral spacing of the two presser wheels without appreciably changing their angular relationship, to change a dimension of the pockets.

3. Mechanism according to claim 2, wherein one of the mounting means mounts its presser wheel for rotation in a fixed position and the other mounting means is movable in position, for adjusting the spacing of the two presser wheels.

4. Mechanism according to claim 3, comprising adjustable force biasing means for urging the movable presser wheel relatively towards the fixed presser wheel, such means being positioned to be opposed by the force of hay between the two wheels, so that such hay will move the movable presser wheel outwardly.

5. Mechanism according to claim 4, wherein said adjustable biasing force means includes a density control adapted to move said first presser wheel in position relative to said second presser wheel.

6. Mechanism according to claim 1, wherein means for feeding the loose hay or the like between the two rings of teeth comprises a delivery trough which extends substantially tangentially to the wheels, radially outwardly of the presser teeth, and an arcuate shield positioned radially inwardly of the presser teeth.

* * * * *